United States Patent
Su et al.

(10) Patent No.: US 11,409,084 B2
(45) Date of Patent: Aug. 9, 2022

(54) LENS MODULE INCLUDING FIVE LENSES OF −+++− REFRACTIVE POWERS, AND ELECTRONIC DEVICE USING THE SAME

(71) Applicant: HON HAI PRECISION INDUSTRY CO., LTD., New Taipei (TW)

(72) Inventors: Yu-Chung Su, New Taipei (TW); Chun-Cheng Ko, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 332 days.

(21) Appl. No.: 16/693,680

(22) Filed: Nov. 25, 2019

(65) Prior Publication Data

US 2020/0241261 A1 Jul. 30, 2020

(30) Foreign Application Priority Data

Jan. 30, 2019 (CN) .......................... 201920166979.8

(51) Int. Cl.
*G02B 13/14* (2006.01)
*G02B 9/60* (2006.01)
*G02B 13/00* (2006.01)

(52) U.S. Cl.
CPC .............. *G02B 13/14* (2013.01); *G02B 9/60* (2013.01); *G02B 13/0045* (2013.01)

(58) Field of Classification Search
CPC ...... G02B 13/14; G02B 9/60; G02B 13/0045; G02B 13/18
See application file for complete search history.

(56) References Cited

U.S. PATENT DOCUMENTS

| | | | |
|---|---|---|---|
| 2015/0241659 A1* | 8/2015 | Huang ............... | G02B 13/0045 359/713 |
| 2017/0082833 A1* | 3/2017 | Huang ............... | G02B 13/0045 |
| 2019/0154974 A1* | 5/2019 | Chen ......................... | G02B 9/64 |
| 2019/0170966 A1* | 6/2019 | Wenren .................... | G02B 9/64 |

* cited by examiner

*Primary Examiner* — Wen Huang
(74) *Attorney, Agent, or Firm* — ScienBiziP, P.C.

(57) ABSTRACT

A lens module includes a first lens having a negative refractive power, a second lens having a positive refractive power, a third lens having a positive refractive power, a fourth lens having a positive refractive power, a fifth lens having a negative refractive power, and an imaging surface, arranged in that sequence from an object side to an image side. The lens module uses infrared light which has a wavelength ranging from 920 to 970 nm, the lens module satisfies the following conditions: $0.0002<|1/F1|<0.01$; $D/TTL>1.1$; $CT4/ET4<1.8$; F1 denotes a focal length of the first lens, D denotes a diameter of a largest imaging circle of the lens module, TTL denotes a distance between an object side surface of the first lens to the imaging surface, CT4 denotes a central thickness of the fourth lens, ET4 denotes an edge thickness of the fourth lens.

14 Claims, 10 Drawing Sheets

LENS MODULE INCLUDING FIVE LENSES OF −+++− REFRACTIVE POWERS, AND ELECTRONIC DEVICE USING THE SAME

FIELD

The subject matter herein generally relates to optical technology, particularly relates to a lens module and an electronic device using the lens module.

BACKGROUND

With the advance of 3D image sensing technology, in recent years, using an infrared lens of a mobile phone to accomplish advanced image analysis or writing an application for improving a 3D resolution combining with some general lens has immerged in the market. Although an imaging effect has been improved, the lens still cannot meet requirements of consumers in terms of a resolution ratio and a relative imaging illumination.

Therefore, there is room for improvement within the art.

BRIEF DESCRIPTION OF THE DRAWINGS

Implementations of the present disclosure will now be described, by way of embodiment, with reference to the attached figures.

DETAILED DESCRIPTION

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

Several definitions that apply throughout this disclosure will now be presented.

The term "substantially" is defined to be essentially conforming to the particular dimension, shape, or other feature that the term modifies, such that the component need not be exact. For example, "substantially cylindrical" means that the object resembles a cylinder, but can have one or more deviations from a true cylinder. The term "comprising" when utilized, means "including, but not necessarily kept to"; it specifically indicates open-ended inclusion or membership in the so-described combination, group, series, and the like.

The present disclosure is described in relation to a lens module and an electronic device using the same.

Figure 1:
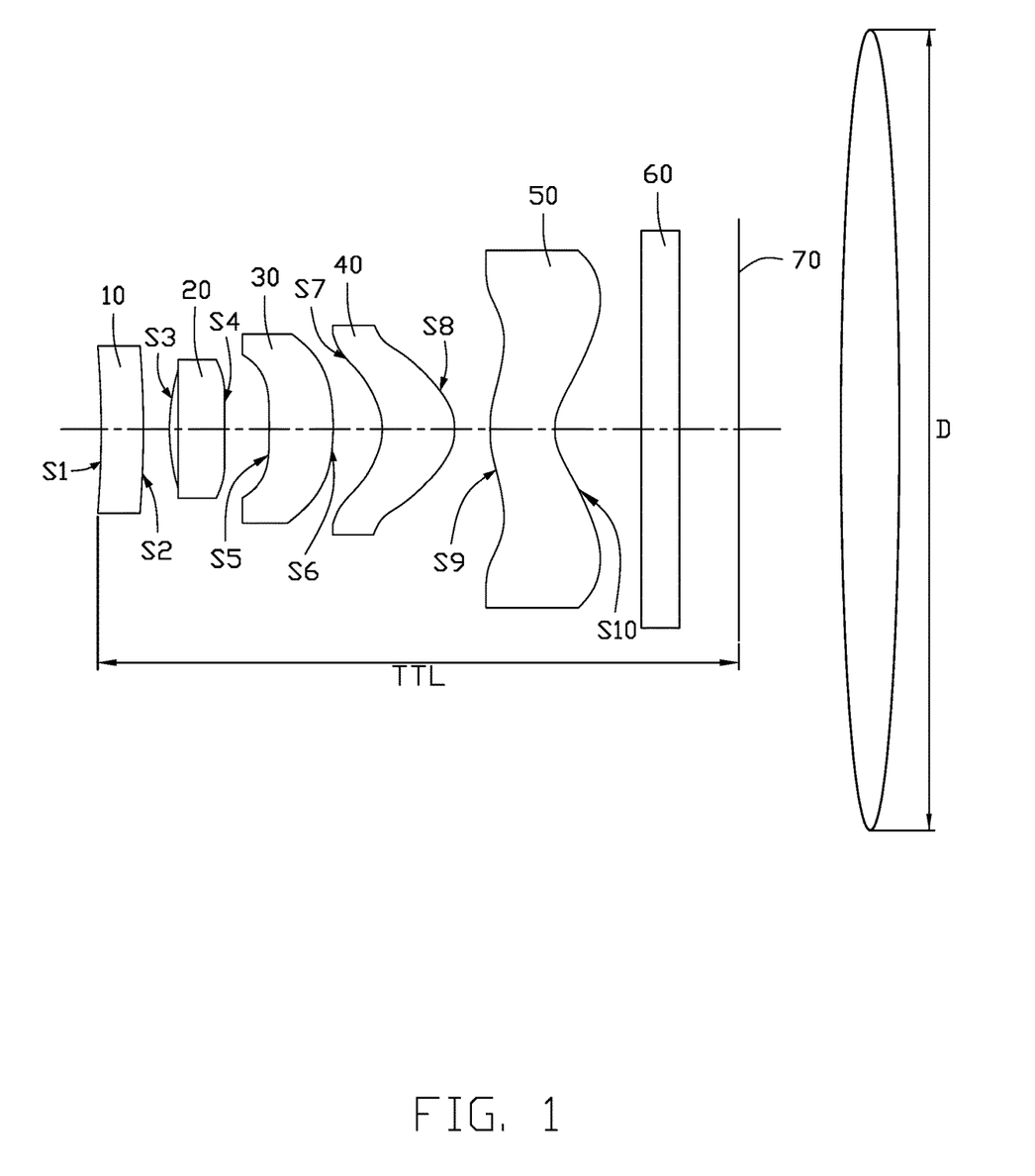
FIG. 1 is an isometric view of a lens module in one embodiment.

FIG. 1 illustrates an embodiment of an lens module 100. The lens module 100 includes a first lens 10 having a negative refractive power, a second lens 20 having a positive refractive power, a third lens 30 having a positive refractive power, a fourth lens 40 having a positive refractive power, a fifth lens 50 having a negative refractive power, a filter 60, and an imaging surface 70, arranged in that sequence from an object side to an image side, along an optical axis of the lens module 100.

When an image is captured, the light enters the lens module 100 from the object side, and sequentially passes through the first lens 10, the second lens 20, the third lens 30, the fourth lens 40, the fifth lens 50, and the filter 60, and are imaged on the imaging surface 70. The filter 60 is configured to filter all light except infrared light. The lens module 100 is operable with infrared light which has a wavelength ranging from 920 to 970 nm.

The first lens 10 includes a first surface S1 facing the object side and a second surface S2 facing the image side. The second lens 20 includes a third surface S3 facing the object side and a fourth surface S4 facing the image side. The third lens 30 includes a fifth surface S5 facing the object side and a sixth surface S6 facing the image side. The fourth lens 40 includes a seventh surface S7 facing the object side and a eighth surface S8 facing the image side. The fifth lens 50 includes a ninth surface S9 facing the object side and a tenth surface S10 facing the image side. The first to tenth surfaces S1, S2, S3, S4, S5, S6, S7, S8, S9, and S10 are all aspherical surfaces.

The first surface S1 is concave on the object side. The second surface S2 is convex on the image side. The third surface S3 is convex on the object side. The fourth surface S4 is convex on the image side. The fifth surface S5 is concave relative to the object side. The sixth surface S6 is convex relative to the image side. The seventh surface S7 is concave relative to the object side. The eighth surface S8 is convex relative to the image side. The ninth surface S9 is convex relative to the object side. The tenth surface S10 is concave relative to the image side.

The lens module 100 satisfies three conditions (1), (2), and (3):

$$0.0002 < |1/F1| < 0.01; \quad (1)$$

$$D/TTL > 1.1; \quad (2)$$

$$CT4/ET4 < 1.8; \quad (3)$$

Wherein, F1 denotes a focal length of the first lens 10, D denotes a diameter of a largest imaging circle of the lens module 100, and TTL denotes a distance between the first surface S1 (i.e., an object side surface) of the first lens 10 to the imaging surface 70. CT4 denotes a central thickness of the fourth lens 40. ET4 denotes an edge thickness of the fourth lens 40. The condition (2) that D/TTL>1.1 limits a total length of the lens module 100 so that the lens module 100 has a preferable size. The condition (3) that CT4/ET4<1.8 gives an ability to the lens module 100 for correcting unevenness or aberrations. The aberrations can mainly includes coma, astigmatism, and distortion.

To enable power of the lens module 100 to be properly distributed thereby reducing a core deviation sensitivity of the lens module 100, the lens module 100 also satisfies condition (4):

$$0<|1/F1|<|1/F3|<|1/F4|; \quad (4)$$

Wherein, F3 and F4 respectively denote focal lengths of the third lens 30 and the fourth lens 40.

In addition, the lens module 100 further satisfies condition (5):

$$|G5R1/F5|>|G5R2/F5|>0; \quad (5)$$

Wherein, G5R1 denotes a radius of curvature of the ninth surface S9, G5R2 denotes a radius of curvature of the tenth surface S10, and F5 denotes a focal length of the fifth lens 50. The lens module 100 can thus have better ability to correct aberrations.

For an imaging quality of the lens module 100, the first lens 10 also requires to satisfy conditions (1.10.1) and (1.10.2):

$$0<G1R1/F1<0.03; \quad (1.10.1)$$

$$0<G1R2/F1<0.03; \quad (1.10.2)$$

Wherein, G1R1 denotes a radius of curvature of the first surface S1, and G1R2 denotes a radius of curvature of the second surface S2.

To further ensure the imaging quality of the lens module 100, the second lens 20 also needs to satisfy conditions (2.20.1) and (2.20.2):

$$0.3<G2R1/F2<1; \quad (2.20.1)$$

$$2<G2R2/F2<3; \quad (2.20.2)$$

Wherein, G2R1 denotes a radius of curvature of the third surface S3, and G2R2 denotes a radius of curvature of the fourth surface S4.

To further ensure the imaging quality of the lens module 100, the third lens 30 also needs to satisfy conditions (3.30.1) and (3.30.2):

$$-5<G3R1/F3<-3; \quad (3.30.1)$$

$$-1<G3R2/F3<0; \quad (3.30.2)$$

Wherein, G3R1 denotes a radius of curvature of the fifth surface S5, and G3R2 denotes a radius of curvature of the sixth surface S6.

To further ensure the imaging quality of the lens module 100, the fourth lens 40 also needs to satisfy the following conditions:

$$-0.7<G4R1/F4<-0.3; \quad (4.40.1)$$

$$-0.5<G4R2/F4<-0.2; \quad (4.40.2)$$

Wherein, G4R1 denotes a radius of curvature of the seventh surface S7, and G4R2 denotes a radius of curvature of the eighth surface S8.

To further ensure the imaging quality of the lens module 100, the fifth lens 50 also needs to satisfy the following conditions:

$$-1<G5R1/F5<-0.5;$$

$$-0.4<G5R2/F5<-0.1.$$

Wherein G5R1 denotes a radius of curvature of the ninth surface S9, and G5R2 denotes a radius of curvature of the tenth surface S10.

In the attached tables, $2\omega$ denotes an angle of view of the lens module 100.

Example 1

The lens module 100 of the example 1 satisfies the conditions listed in Tables 1 to 3.

Table 1 lists parameters of the lens module 100 of the example 1.

TABLE 1

| surface | Type | Radius of curvature (mm) | thickness (mm) | Conic |
|---|---|---|---|---|
| OBJ | Standard | Infinity | 600 | |
| AIR | Standard | Infinity | 0.00 | |
| G1R1 | Asphere | −32.1670 | 0.3520 | 0 |
| G1R2 | Asphere | −33.2330 | 0.0942 | 0 |
| STO | Standard | Infinity | −0.0700 | |
| G2R1 | Asphere | 2.2664 | 0.4300 | −2.67 |
| G2R2 | Asphere | 10.4586 | 0.2211 | −182.87 |
| G3R1 | Asphere | −28.4753 | 0.5051 | 0 |
| G3R2 | Asphere | −3.547 | 0.2144 | 5.35 |
| G4R1 | Asphere | −1.0054 | 0.5635 | −0.30 |
| G4R2 | Asphere | −0.6875 | 0.3210 | −0.97 |
| G5R1 | Asphere | 1.9172 | 0.5130 | −0.12 |
| G5R2 | Asphere | 0.7288 | 0.5611 | −4.83 |
| IR | Standard | Infinity | 0.3000 | |
| AIR | Standard | Infinity | 0.3700 | |
| IMA | Standard | — | | |

Table 2 lists high-order aspherical coefficients of the lens module 100 of the example 1.

TABLE 2

| Aspheric coefficient | G1R1 | G1R2 | G2R1 | G2R2 | G3R1 | G3R2 | G4R1 | G4R2 | G5R1 | G5R2 |
|---|---|---|---|---|---|---|---|---|---|---|
| A4 | 0.3413 | 0.2858 | −0.2536 | −0.0296 | −0.5747 | −0.5031 | −0.0345 | −0.1124 | −0.0124 | 0.1124 |
| A6 | 0.0923 | −0.3695 | −0.9982 | −0.4401 | −0.0368 | 0.2686 | 0.0335 | 0.0473 | 0.1473 | 0.473 |
| A8 | 1.3115 | 8.7149 | 2.5297 | 0.9104 | 1.1233 | −0.1416 | −0.0117 | −8.6E−03 | −6.6E−03 | 8.6E−03 |
| A10 | −3.13.88 | −37.9902 | −14.5061 | −1.3497 | −0.4446 | 0.0597 | 2.8E−03 | 1.7E−03 | 5.7E−03 | 4.7E−03 |
| A12 | 5.2416 | 56.1674 | −0.8112 | 0.3807 | −0.1366 | −2.4E−03 | −2.8E−04 | −2.6E−04 | 5.6E−04 | 4.6E−04 |

Table 3 lists optical parameters of the lens module 100 of the example 1.

TABLE 3

| F(mm) | F/NO | 2ω | D(mm) | TTL(mm) |
|---|---|---|---|---|
| 2.21 | 1.8 | 98.0° | 4.48 | 4.004 |

Figure 2:
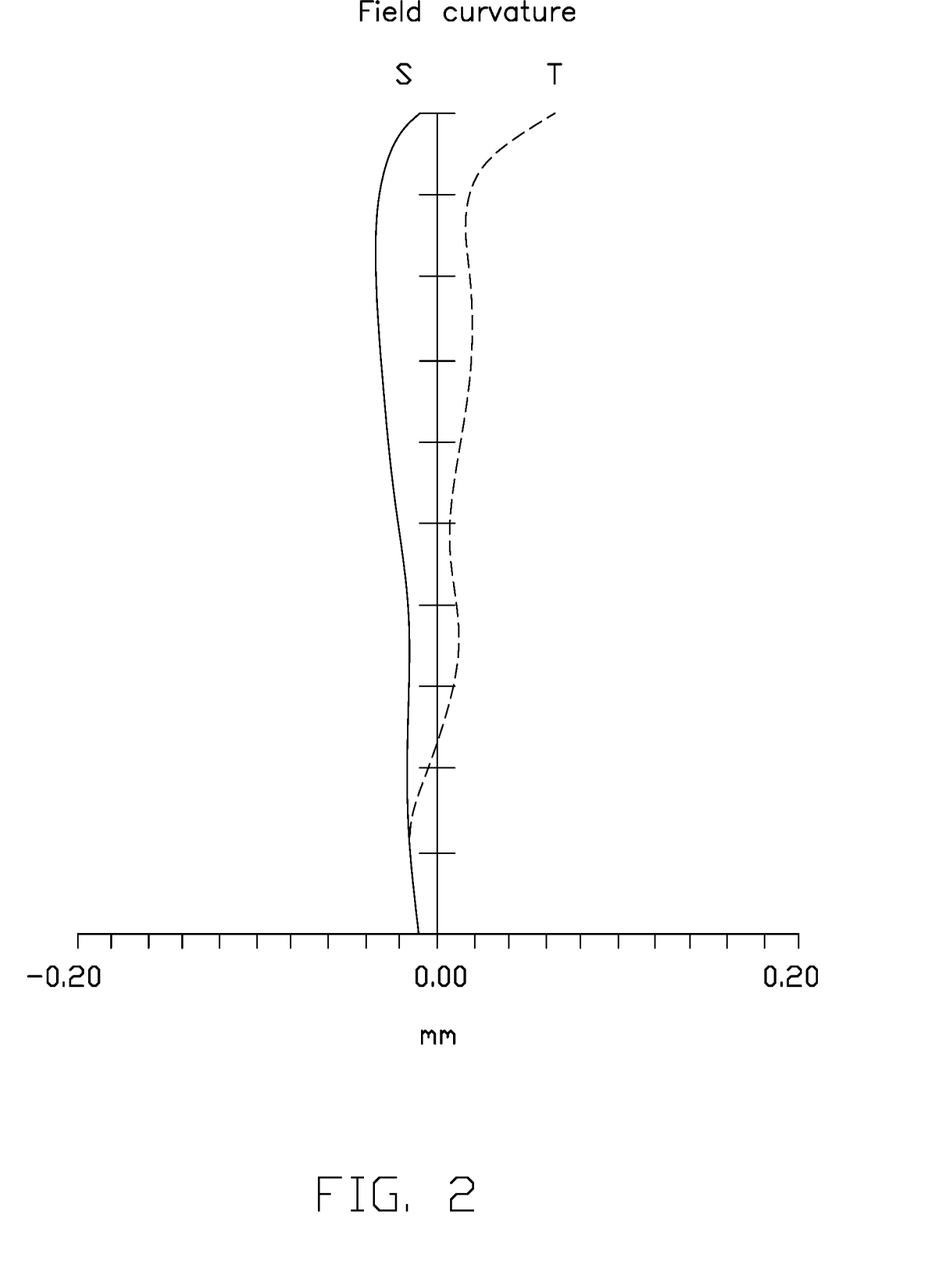
FIG. 2 is a field curvature diagram of a lens module in one embodiment.
Figure 3:
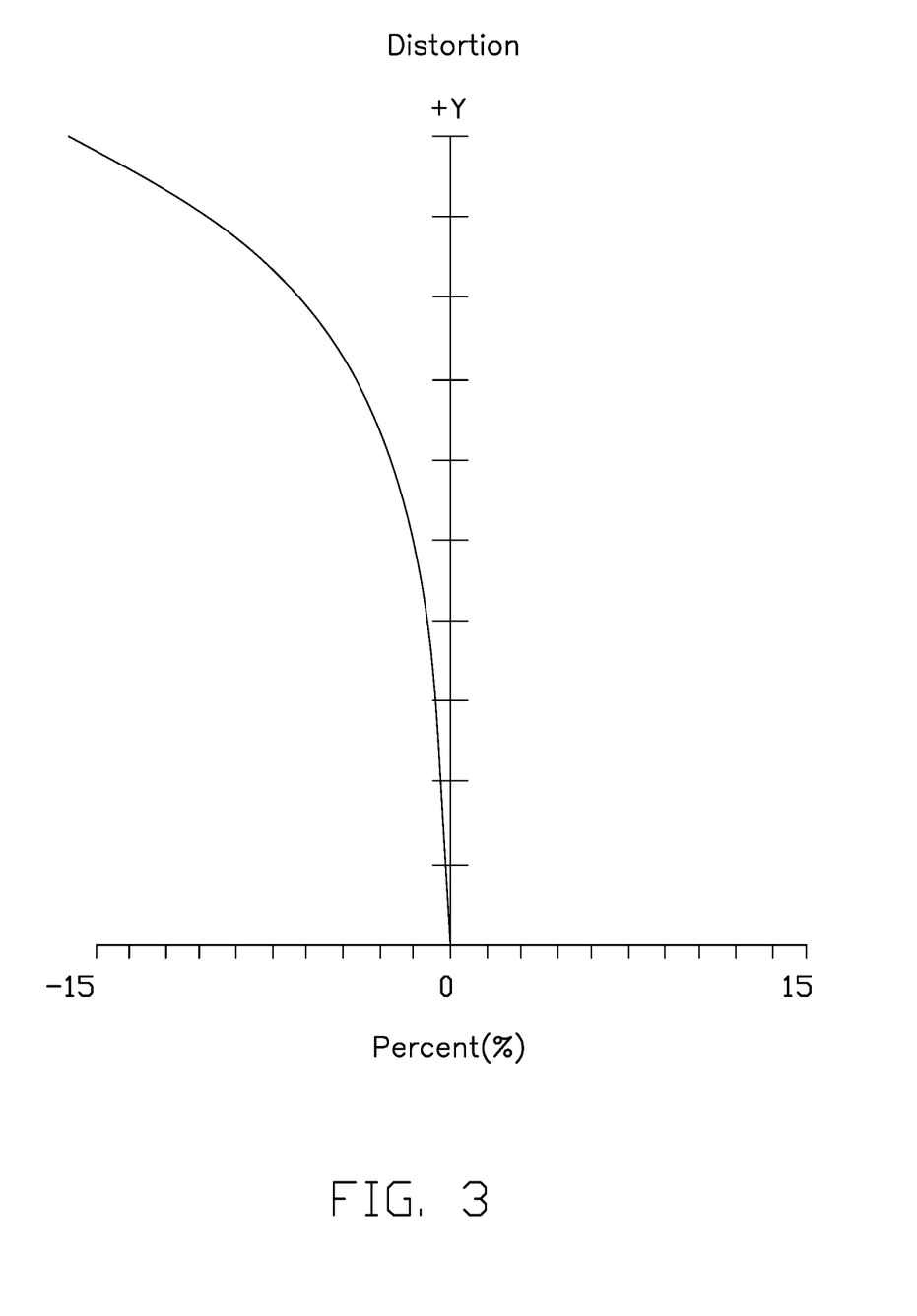
FIG. 3 is a distortion diagram of the lens module as illustrated in FIG. 2.
Figure 4:
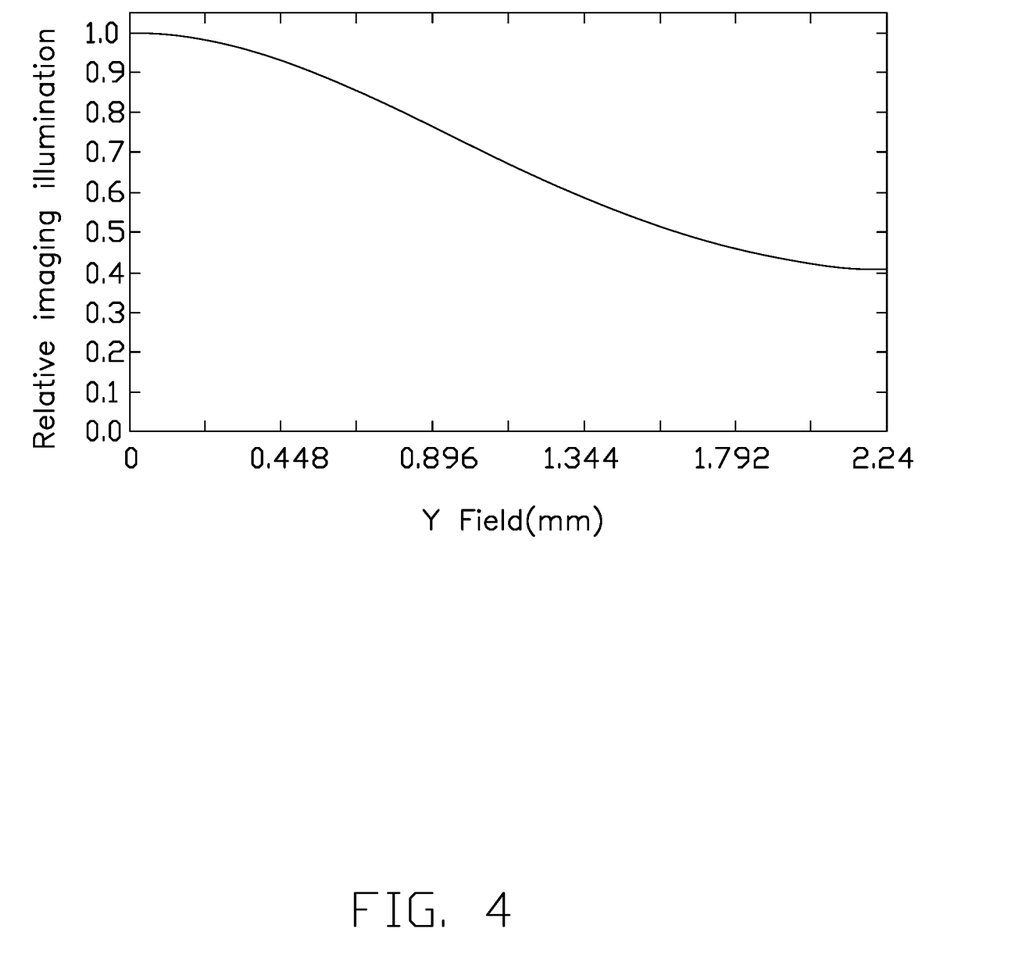
FIG. 4 is a relative imaging illumination diagram of the lens module as illustrated in FIG. 2.
Figure 5:
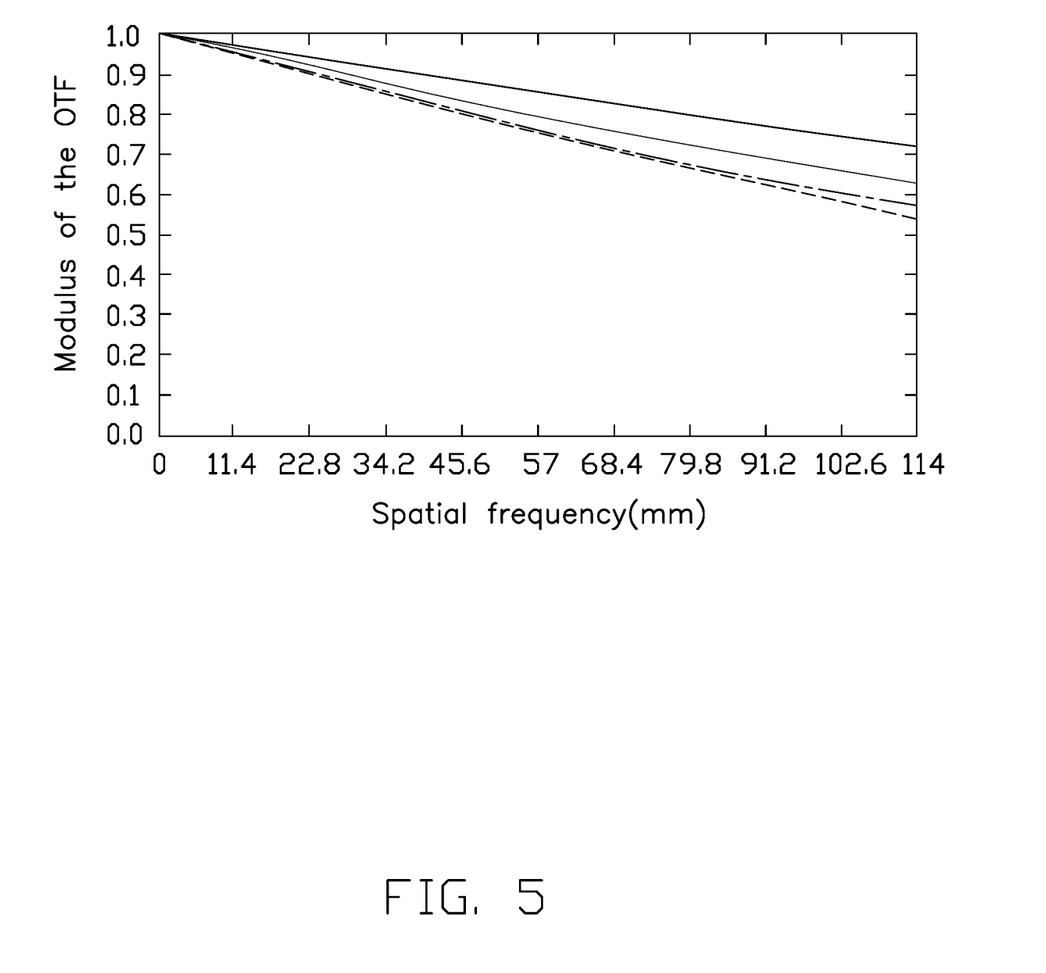
FIG. 5 is a modulation transfer function (MTF) diagram of the lens module as illustrated in FIG. 2.
Figure 6:
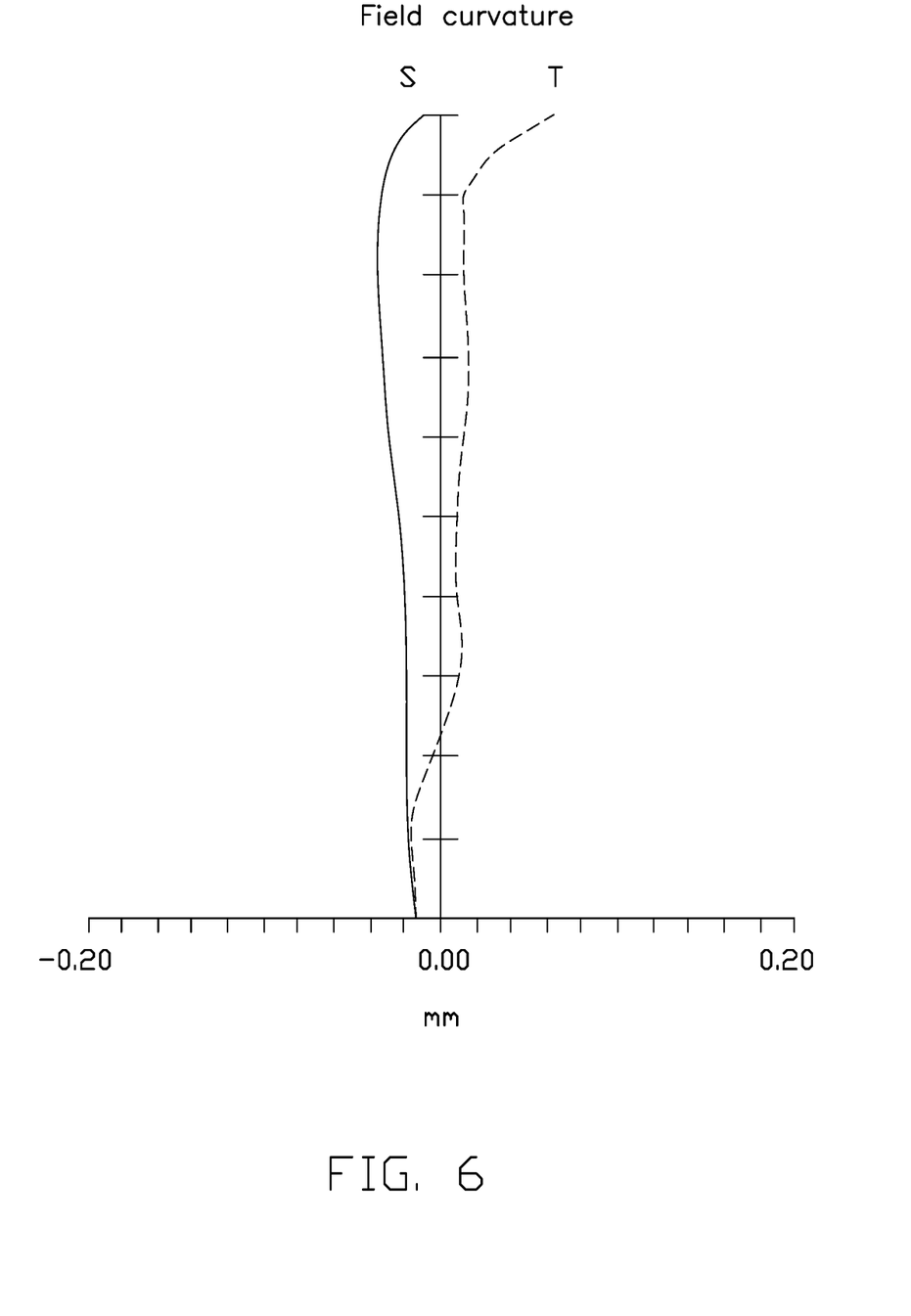
FIG. 6 is a field curvature diagram of a second embodiment of a lens module.
Figure 7:
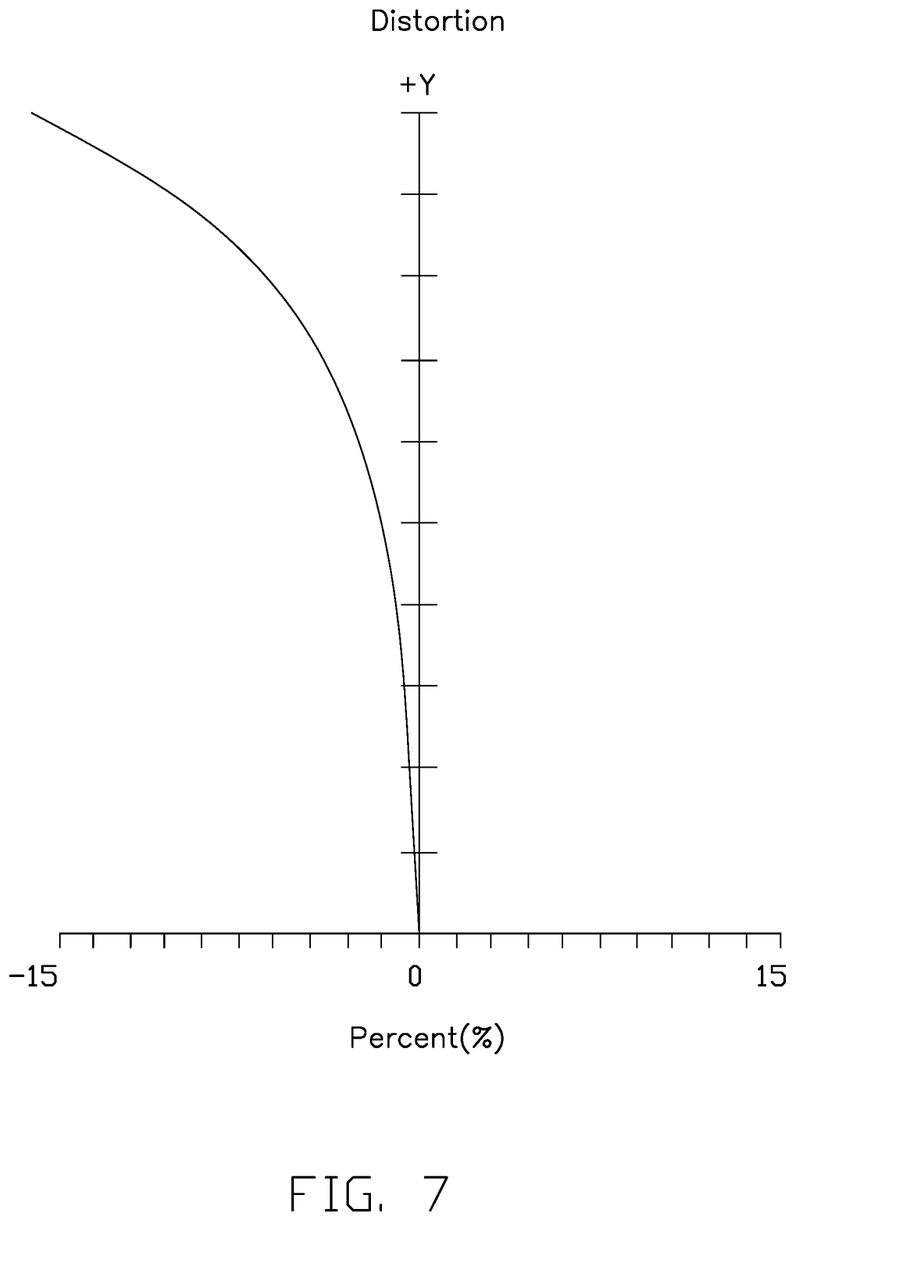
FIG. 7 is a distortion diagram of the lens module as illustrated in FIG. 6.
Figure 8:
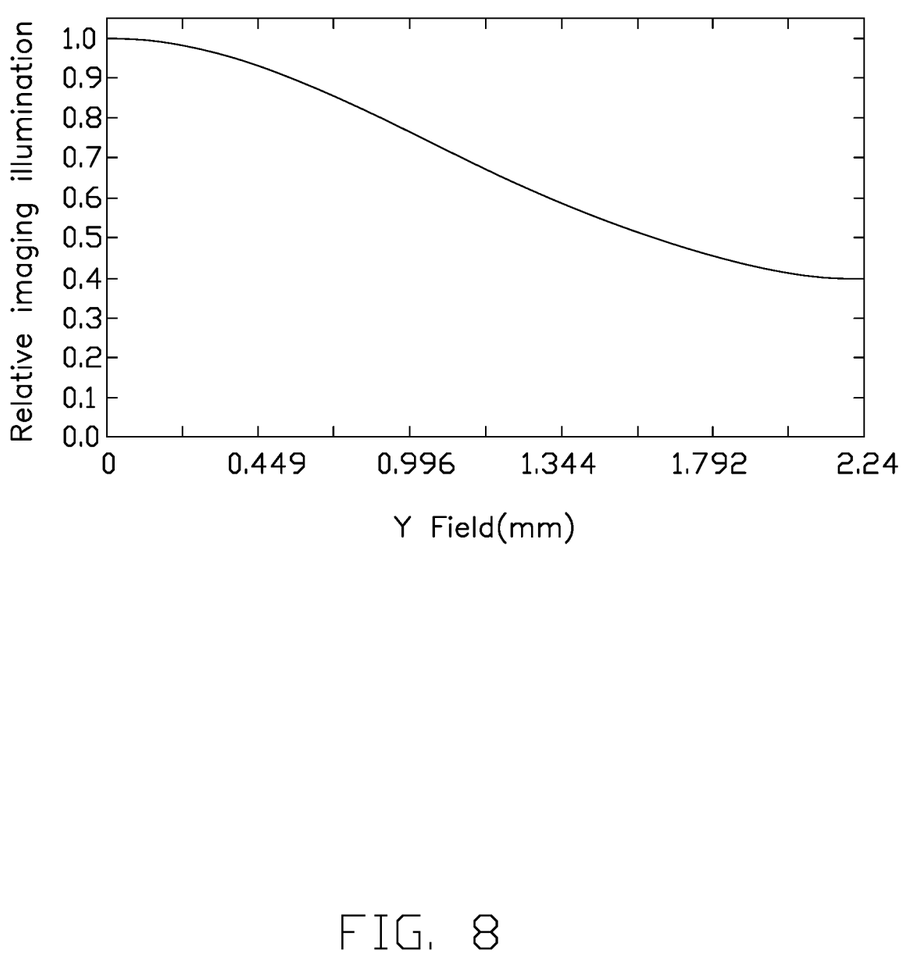
FIG. 8 is a relative imaging illumination diagram of the lens module as illustrated in FIG. 6.
Figure 9:
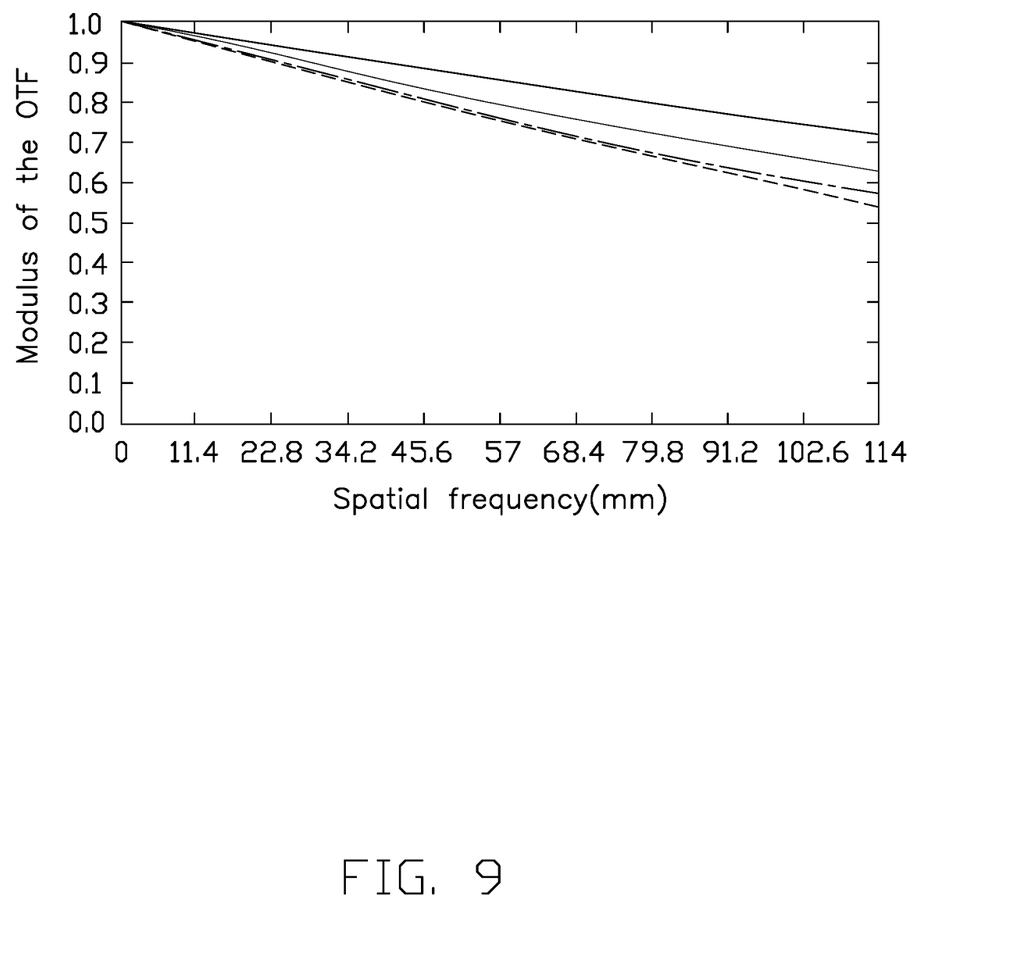
FIG. 9 is an MTF diagram of the lens module as illustrated in FIG. 6.

In the first embodiment, field curvature curves, a distortion curve, a relative imaging illumination curve, and MTF curves of the lens module 100 are respectively shown in FIG. 2, FIG. 3, FIG. 4 and FIG. 5. The field curvature characteristic curves include curve S and curve T which are respectively a tangential field curve and a tangential field curve of the lens module 100. As shown in FIG. 2, values of the tangential field and the tangential field of the lens module 100 are kept between −0.05 and 0.05 mm. As shown in FIG. 3, a distortion value of the lens module 100 is kept within 0-15%. As shown in FIG. 4, a relative imaging illumination value of the lens module 100 can be maintained at a high level, and the relative imaging illumination value is maintained to be greater than 0.4. As shown in FIG. 5, under the condition of ½ frequency (114 lp/mm), an MTF value of a central view field is greater than 72% (shown in the upper curve), and an MTF value of a corner of 0.8 field-of-view is greater than 55% (shown in the lower curve). A remaining MTF of a field-of-view between the central view field and the corner of 0.8 field-of-view is between 72% and 55%, such as a corner of 0.6 field-of-view (shown in the middle curve).

Example 2

The lens module 100 of the example 2 satisfies the conditions listed in Tables 4 to 6.

TABLE 4

(lists parameters of the lens module 100 of the example 2)

| surface | Type | Radius of curvature (mm) | thickness (mm) | Conic |
|---|---|---|---|---|
| OBJ | Standard | Infinity | | |
| AIR | Standard | Infinity | | |
| G1R1 | Asphere | −56.3547 | 0.3111 | 0 |
| G1R2 | Asphere | −52.0370 | 0.1230 | −0 |
| STO | Standard | Infinity | −0.07 | |
| G2R1 | Asphere | 2.2614 | 0.4300 | −2.65 |
| G2R2 | Asphere | 10.7843 | 0.2232 | −100 |
| G3R1 | Asphere | −23.7554 | 0.5125 | 5.3 |
| G3R2 | Asphere | −3.5027 | 0.2223 | −0.31 |
| G4R1 | Asphere | −1.0077 | 0.5715 | −0.97 |
| G4R2 | Asphere | −0.68922 | 0.0300 | −0.12 |
| G5R1 | Asphere | 1.9094 | 0.515 | −4.84 |
| G5R2 | Asphere | 0.7291 | 0.5611 | |
| CG | Standard | Infinity | 0.3000 | |
| AIR | Standard | Infinity | 0.3700 | |
| IMA | Standard | — | | |

Table 5 lists high-order aspherical coefficients of the lens module 100 of the example 2.

TABLE 5

| Aspheric coefficient | G1R1 | G1R2 | G2R1 | G2R2 | G3R1 |
|---|---|---|---|---|---|
| A4 | 0.0184 | 1.4E−03 | −0.0171 | 8.7E−03 | −9.0E−03 |
| A6 | −1.8E−03 | 0.0133 | 4.7E−03 | −3.7E−04 | −5.7E−03 |
| A8 | 2.3E−04 | −0.0105 | −9.8E−03 | 3.1E−05 | 9.4E−04 |
| A10 | −5.5E−07 | 4.6E−04 | −1.7E−04 | 1.2E−05 | 1.8E−06 |

| Aspheric coefficient | G3R2 | G4R1 | G4R2 | G5R1 | G5R2 |
|---|---|---|---|---|---|
| A4 | −0.0293 | −4.7E−03 | −4.4E−03 | −4.7E−03 | −4.4E−03 |
| A6 | 3.3E−03 | 3.7E−04 | 1.3E−04 | 3.7E−04 | 1.3E−04 |
| A8 | −3.8E−04 | −1.1E−05 | 3.6E−08 | −1.1E−05 | 3.6E−08 |
| A10 | 1.9E−05 | 1.3E−07 | −2.2E−09 | 1.3E−07 | −2.2E−09 |

Table 6 lists optical parameters of the lens module 100 of the example 2.

TABLE 6

| F(mm) | F/NO | 2ω | D(mm) | TTL(mm) |
|---|---|---|---|---|
| 2.02 | 1.79 | 98.2° | 4.48 | 4.004 |

Referring to FIG. 6 to FIG. 9, a field curvature value of the lens module 100 is kept between −0.05 and 0.05 mm. A distortion value of the lens module 100 is kept between 1-15%. A relative imaging illumination value of the lens module 100 is maintained to be greater than 0.4. An MTF value of a central field-of-view is greater than 72%. An MTF value of a corner of 0.8 field-of-view is greater than 55%. A remaining MTF of a field-of-view between the central field-of-view and the corner of 0.8 field-of-view is between 72% and 55%.

In summary, under the above conditions, the lens module 100 has the characteristics of the high resolution ratio and the high relative imaging illumination.

Figure 10:
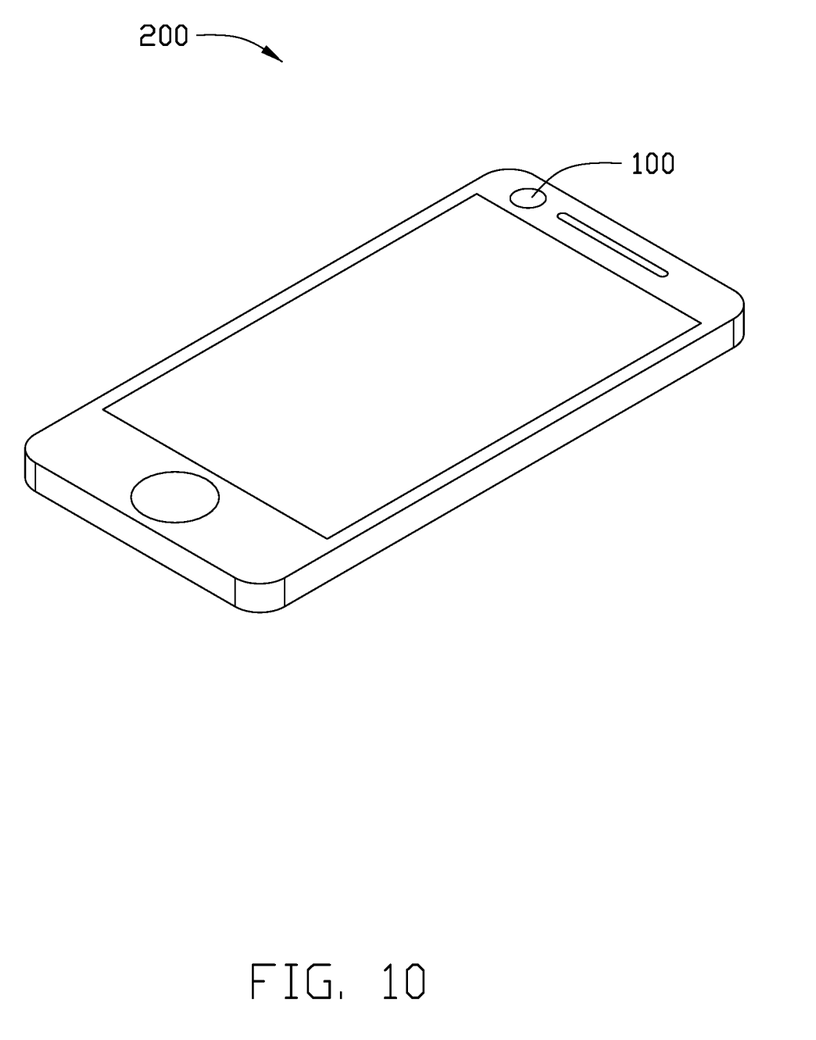
FIG. 10 is an isometric view of an embodiment of an electronic device using the lens module of FIG. 1.

Referring to FIG. 10, the lens module 100 can be used in various electronic devices having a camera module, such as a mobile phone, a notebook computer, a desktop computer, a games machine, an LCD TV, a camera, and a monitoring device. In this embodiment, the lens module 100 is used in a mobile phone 200.

The lens module 100 can achieve the characteristics of the high resolution ratio and the high relative imaging illumination by satisfying certain conditions.

The embodiments shown and described above are only examples. Many details are often found in the art such as the other features of the antenna structure and the wireless communication device. Therefore, many such details are neither shown nor described. Even though numerous characteristics and advantages of the present disclosure have been set forth in the foregoing description, together with details of the structure and function of the present disclosure, the disclosure is illustrative only, and changes may be made in the details, especially in matters of shape, size, and arrangement of the parts within the principles of the present disclosure, up to and including the full extent established by the broad general meaning of the terms used in the claims. It will therefore be appreciated that the embodiments described above may be modified within the scope of the claims.

What is claimed is:

1. A lens module, wherein the lens module is operable with infrared light which has a wavelength ranging from 920 to 970 nm, the lens module substantially consisting of:
   a first lens having a negative refractive power;
   a second lens having a positive refractive power;
   a third lens having a positive refractive power;
   a fourth lens having a positive refractive power;

a fifth lens having a negative refractive power; and
an imaging surface, wherein the first lens, the second lens, the third lens, the fourth lens, and the fifth lens are arranged in that sequence from an object side to an image side, the lens module satisfies the following conditions:

$0.0002<|1/F1|<0.01$;

$D/TTL>1.1$;

$CT4/ET4<1.8$;

wherein, F1 denotes a focal length of the first lens, D denotes a diameter of a largest imaging circle of the lens module, TTL denotes a distance between an object side surface of the first lens to the imaging surface, CT4 denotes a central thickness of the fourth lens, ET4 denotes an edge thickness of the fourth lens.

2. The lens module of claim 1, wherein the first lens comprises a first surface facing the object side and a second surface facing the image side, the second lens comprises a third surface facing the object side and a fourth surface facing the image side, the third lens comprises a fifth surface facing the object side and a sixth surface facing the image side, the fourth lens comprises a seventh surface facing the object side and a eighth surface facing the image side, the fifth lens comprises a ninth surface facing the object side and a tenth surface facing the image side, each of the first to the tenth surfaces is an aspherical surface.

3. The lens module of claim 2, wherein the first surface is concave on the object side, the second surface is convex on the image side, the third surface is convex on the object side, the fourth surface is convex on the image side, the fifth surface is concave on the object side, the sixth surface is convex on the image side, the seventh surface is concave on the object side, the eighth surface is convex on the image side, the ninth surface is convex on the object side, the tenth surface is concave on the image side.

4. The lens module of claim 2, wherein the lens module further satisfies the following conditions:

$0<|1/F1|<|1/F3|<|1/F4|$;

wherein F3 and F4 respectively denotes focal lengths of the third lens and the fourth lens.

5. The lens module of claim 2, wherein the lens module further satisfies the following conditions:

$|G5R1/F5|>|G5R2/F5|>0$;

wherein G5R1 denotes a radius of curvature of the ninth surface, G5R2 denotes a radius of curvature of the tenth surface, and F5 denotes a focal length of the fifth lens.

6. The lens module of claim 2, wherein the lens module further satisfies the following conditions:

$0<G1R1/F1<0.03, 0<G1R2/F1<0.03$;

$0.3<G2R1/F2<1, 2<G2R2/F2<3$;

$-5<G3R1/F3<-3, -1<G3R2/F3<0$;

$-0.7<G4R1/F4<-0.3, -0.5<G4R2/F4<-0.2$;

$-1<G5R1/F5<-0.5, -0.4<G5R2/F5<-0.1$;

wherein G1R1, G1R2, G2R1, G2R2, G3R1, G3R2, G4R1, and G4R2 are respectively denotes radiuses of curvature of the first surface, the second surface, the third surface, the fourth surface, the fifth surface, the sixth surface, the seventh surface, and the eighth surface.

7. The lens module of claim 2, further comprising a filter arranged between the fifth lens and the imaging surface.

8. An electronic device comprising:
a lens module, wherein the lens module is operable with infrared light which has a wavelength ranging from 920 to 970 nm, substantially consisting of:
a first lens having a negative refractive power;
a second lens having a positive refractive power;
a third lens having a positive refractive power;
a fourth lens having a positive refractive power;
a fifth lens having a negative refractive power; and
an imaging surface, wherein the first lens, the second lens, the third lens, the fourth lens, and the fifth lens are arranged in that sequence from an object side to an image side, the lens module uses infrared light which has a wavelength ranging from 920 to 970 nm, the lens module satisfies the following conditions:

$0.0002<|1/F1|<0.01$;

$D/TTL>1.1$;

$CT4/ET4<1.8$;

wherein, F1 denotes a focal length of the first lens, D denotes a diameter of a largest imaging circle of the lens module, TTL denotes a distance between an object side surface of the first lens to the imaging surface, CT4 denotes a central thickness of the fourth lens, ET4 denotes an edge thickness of the fourth lens.

9. The electronic device of claim 8, wherein the first lens comprises a first surface facing the object side and a second surface facing the image side, the second lens comprises a third surface facing the object side and a fourth surface facing the image side, the third lens comprises a fifth surface facing the object side and a sixth surface facing the image side, the fourth lens comprises a seventh surface facing the object side and a eighth surface facing the image side, the fifth lens comprises a ninth surface facing the object side and a tenth surface facing the image side, each of the first to the tenth surfaces is an aspherical surface.

10. The electronic device of claim 9, wherein the first surface is concave on the object side, the second surface is convex on the image side, the third surface is convex on the object side, the fourth surface is convex on the image side, the fifth surface is concave on the object side, the sixth surface is convex on the image side, the seventh surface is concave on the object side, the eighth surface is convex on the image side, the ninth surface is convex on the object side, the tenth surface is concave on the image side.

11. The electronic device of claim 9, wherein the lens module further satisfies the following conditions:

$0<|1/F1|<|1/F3|<|1/F4|$;

wherein F3 and F4 respectively denotes focal lengths of the third lens and the fourth lens.

12. The electronic device of claim 9, wherein the lens module further satisfies the following conditions:

$|G5R1/F5|>|G5R2/F5|>0$;

wherein G5R1 denotes a radius of curvature of the ninth surface, G5R2 denotes a radius of curvature of the tenth surface, and F5 denotes a focal length of the fifth lens.

13. The electronic device of claim 9, wherein the lens module further satisfies the following conditions:

$0<G1R1/F1<0.03, 0<G1R2/F1<0.03$;

$0.3<G2R1/F2<1, 2<G2R2/F2<3$;

$-5 < G3R1/F3 < -3$, $-1 < G3R2/F3 < 0$;

$-0.7 < G4R1/F4 < -0.3$, $-0.5 < G4R2/F4 < -0.2$;

$-1 < G5R1/F5 < -0.5$, $-0.4 < G5R2/F5 < -0.1$;

wherein G1R1, G1R2, G2R1, G2R2, G3R1, G3R2, G4R1, and G4R2 are respectively denotes radiuses of curvature of the first surface, the second surface, the third surface, the fourth surface, the fifth surface, the sixth surface, the seventh surface, and the eighth surface.

14. The electronic device of claim 9, wherein the lens module further comprises a filter arranged between the fifth lens and the imaging surface.

\* \* \* \* \*